(No Model.) 2 Sheets—Sheet 1.
W. A. BROWN.
SEED PLANTER.
No. 269,172. Patented Dec. 19, 1882.
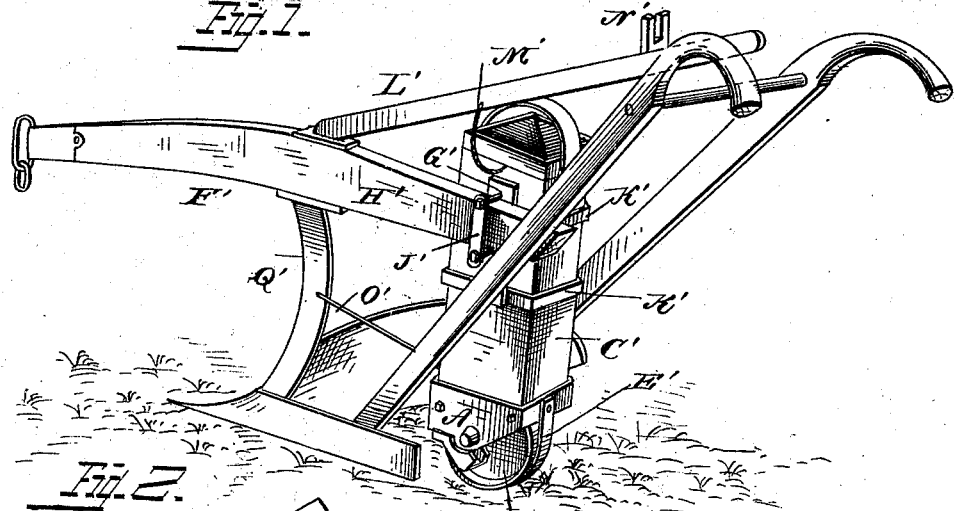
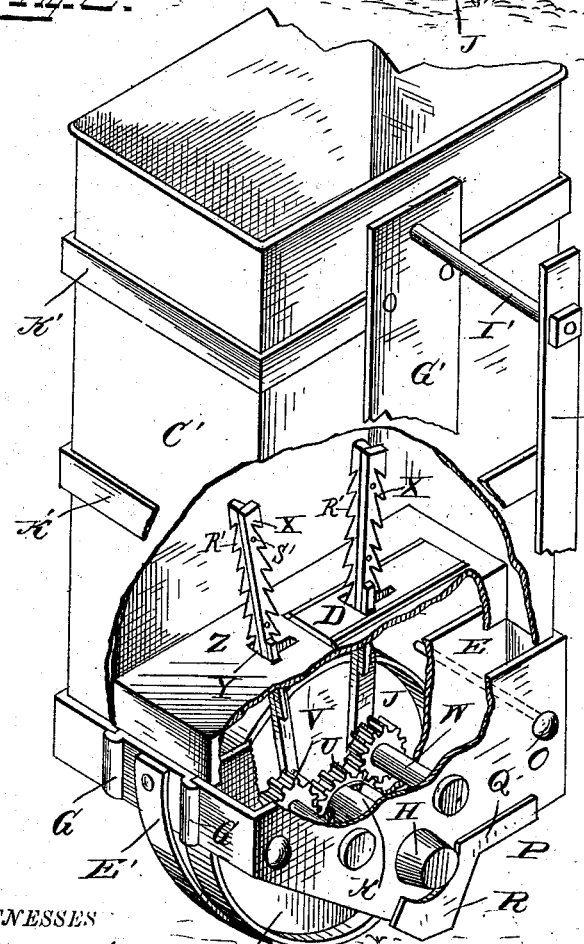
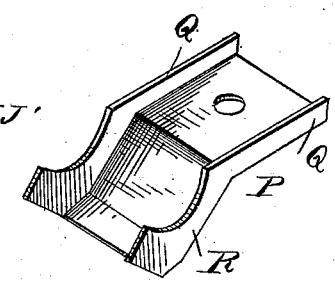
WITNESSES
F. L. Ourand
J. R. Littell
INVENTOR
Wm. A. Brown
by C. A. Snow & Co.
Attorneys
N. PETERS, Photo-Lithographer, Washington, D. C.

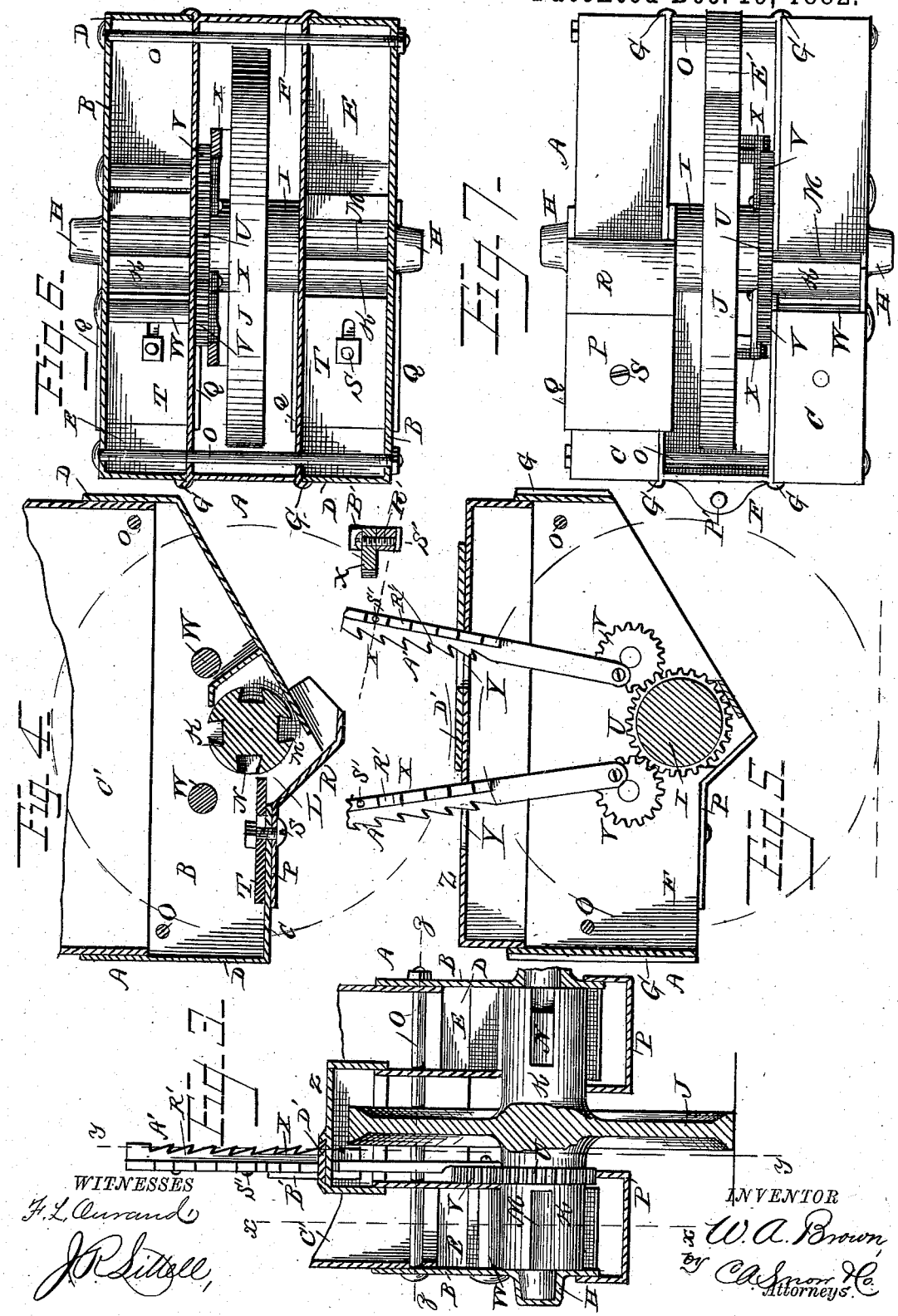

UNITED STATES PATENT OFFICE.

WILLIAM A. BROWN, OF TERRELL, TEXAS.

SEED-PLANTER.

SPECIFICATION forming part of Letters Patent No. 269,172, dated December 19, 1882.

Application filed October 16, 1882. (No model.)

*To all whom it may concern:*

Be it known that I, WILLIAM A. BROWN, a citizen of the United States, residing at Terrell, in the county of Kaufman and State of Texas, have invented a new and useful Seed-Planter, of which the following is a specification, reference being had to the accompanying drawings.

Figure 1 is a perspective view, showing my improved seed-planter attached to a plow ready for operation. Fig. 2 is a perspective view of the planter detached, part of the hopper having been broken away for the purpose of better showing the construction. Fig. 3 is a vertical transverse sectional view. Fig. 4 is a vertical longitudinal sectional view on the line $x$ $x$, Fig. 3. Fig. 5 is a vertical longitudinal sectional view on the line $y$ $y$, Fig. 3. Fig. 6 is a horizontal sectional view on the line $z$ $z$, Fig. 3. Fig. 7 is a bottom plan, the mud-guard on one side having been removed; and Fig. 8 is a detail view of the mud-guard.

Corresponding parts in the several figures are denoted by like letters of reference.

This invention relates to an improved seed-planter, adapted to be attached to and operated in connection with any ordinary plow for planting wheat, corn, cotton, or other seed, or guano; and it consists in certain improvements in the construction of the same, which will be hereinafter fully described, and particularly pointed out in the claims.

In the drawings, A represents the seed-box of my improved planter, which is made preferably of cast-iron and in the following manner:

B B are the sides, which have inwardly-projecting flanges, forming the bottoms C and ends D of the compartments E of the seed-box.

F is a frame, provided at the ends with flanges G, to receive the end pieces, D, which are fitted between said flanges, as clearly shown in Fig. 6 of the drawings, the sides of frame F forming the inner sides of the compartments E. The sides B of the seed-box have recesses or boxes H in their inner sides to receive the ends of a transverse shaft, I, having a wheel, J, which works in the frame F, separate from the compartments of the seed-box. The shaft I is also provided with cylinders K, working in slots L in the bottoms of the compartments of the seed-box, and having longitudinal dovetailed grooves, forming seed-cups M. To regulate the quantity of seed to be planted, these grooves may be partly filled with plugs N, of wood or other material; or the plugs may entirely fill any of the seed-cups desired for the purpose of regulating the intervals of dropping the seed.

The sides B B of the seed-box are connected, after the frame F has been interposed and the shaft I placed in position, by transverse bolts O O, which serve to bind the parts securely together.

P P are flanged plates, bolted upon the under sides of the bottoms C of the compartments E in front of the slots L, in which the seeding-cylinders revolve. The flanges Q of the plates P clamp together the outer sides, A, of the seed-box and the sides of frame F, which form the outer and inner sides of the compartments E, thus assisting the bolts O in holding the parts together. The plates P are provided with rearwardly and downwardly inclined flanged extensions R, serving to protect the seeding-cylinders exposed through the slots L from mud, and also to receive the seed and guide it to the ground. The bolts S, which serve to secure the mud-guards in position, also serve to hold the cut-off plates T, which may be of leather, rubber, or other suitable material, and which are placed in the bottom of the seed-compartments, bearing against the seeding-cylinders.

The shaft I is provided with a gear-wheel, U, located adjoining the wheel J and meshing with two pinions, V V, mounted upon shafts W, which are journaled in one of the sides of frame F, extending through one of the compartments E of the seed-box and into the side B of the latter.

X X are bars, pivoted eccentrically to the faces of the pinions V and extending upwardly through slots Y in a cover, Z, with which the frame F is provided. The bars X are saw-toothed, as shown at A', and they are provided with laterally-projecting flanges B', to accommodate which the slots Y are L or T shaped, as shown. It will be observed that when the wheel J revolves not only are the seeding-cylinders operated, but at the same time a vertical reciprocating and oscillating or pendulum motion is imparted to the toothed feed-bars X, serving, when the machine is used for planting cotton-seed, to feed the seed through the slots Y, from whence it drops through the frame F upon the ground.

C' is an upwardly-extending casing or hopper, bolted or otherwise secured to the upper edge of the seed-box A, of which it forms an extension. When the machine is used for planting other than cotton-seed the feed-bars X should be detached and the slots Y covered by a slide, D', which prevents the seed from dropping out through said slots. When cotton-seed is planted a portion of it may find its way into the compartments E, but will in no way interfere with the planting.

Secured to the rear side of the seed-box A is a curved steel plate, E', the end of which bears against the wheel J, forming a scraper, which serves to remove from said wheel any mud or dirt which may adhere to it during operation.

In Fig. 1 of the drawings I have shown my improved seed-planter attached to a plow in position for operation. The said plow, which may be of any suitable construction, is denoted by letter F'.

G' is a plate secured to the side of the plow-beam H' near the rear end of the latter, by bolts I' and a clamping plate or clip, J'. Said plate is provided with horizontal bands K' at its upper and lower ends of suitable size to receive the hopper C', which is fitted in the said bands in such a manner that it may slide freely vertically. By this arrangement it will be observed that at all times, no matter whether the plow runs deep or shallow, the wheel J, which supports the planter, will run upon the ground and operate the seeding mechanism. The planter, being located between the land-side and mold-board of the plow, directly in rear of the latter, will run square in the furrow, and will thus drop every seed in the moist ground, where it will be sure to grow if sound.

L' is a lever, pivoted to the plow-beam and connected with the hopper C' by a chain or wire, M'. An upright or prop, N', is provided, upon which the lever may be supported when raised. It will be seen that by raising the lever L' the entire planter may be lifted, thus raising the wheel J off the ground and throwing the seeding mechanism out of operation, as is desirable, for instance, while turning the plow at the end of a field.

O' is a chain or wire connecting a lug, P', at the front end of the seed-box with the plow-standard Q' for the purpose of bracing and steadying the device during operation.

From the foregoing description, taken in connection with the drawings hereto annexed, the operation and advantages of my improved seed-planter will be readily understood. It may be readily converted so as to plant either wheat, oats, or the like, or cotton-seed; and I would add that when it is used for the latter purpose, if the toothed feed-bars X, herein described, should be found not to feed a sufficient quantity of seed, I remedy this by attaching to the sides of said feed-bars additional toothed bars R', as shown in the drawings. To accommodate these additional bars it will be necessary to make the slots Y T-shaped instead of L-shaped. Otherwise no alterations will be necessary. The bars R' may be secured in position by means of screws S', so that they may be readily detached when desired.

My improved planter will ordinarily sow the seed broadcast, the mud-guard plates serving to scatter the seed; but the said plates may be detached, thus permitting the seed to drop direct upon the ground or in drills.

I claim and desire to secure by Letters Patent of the United States—

1. The combination of the flanged sides B, the intermediate frame, F, the transverse connecting-bolts, and the mud-guard plates having flanges, which serve to clamp together the sides B and the sides of frame F, as set forth.

2. The combination of the flanged sides B, the intermediate frame, F, the transverse connecting-bolts, the shaft I, having wheel J, and seeding-cylinders K, the flanged mud-guard plates, the elastic cut-off plates, and bolts passing through the bottom of the seed-box and serving to secure in position said mud-guards and cut-offs, as set forth.

3. The seed-box constructed, as described, with the intermediate frame, F, and with two compartments, E E, in combination with the upwardly-extending hopper C', and a cover, Z, for said frame F, as set forth.

4. The combination of the seed-box constructed with the frame F, the transverse shaft I, having wheel J and gear-wheel U, the pinions V V, mounted upon shafts journaled transversely in one of the sides of the seed-box and meshing with said gear-wheel U, toothed feed-bars X, pivoted eccentrically to the faces of said pinions, and the cover Z, having slots Y, as set forth.

5. The combination of the seed-box, the hopper, the vertically reciprocating and oscillating toothed feed-bars X, having flanges B', the cover Z, having slots Y, and mechanism for operating said feed-bars, as set forth.

6. The combination, with the toothed feed-bars X, of the detachable toothed bars R', as and for the purpose set forth.

In testimony that I claim the foregoing as my own I have hereto affixed my signature in presence of two witnesses.

WILLIAM A. BROWN.

Witnesses:
WM. BAGGER,
EDWARD G. SIGGERS.